J. H. HARDWICK.
VEHICLE WHEEL.
APPLICATION FILED JAN. 13, 1910.
990,649.
Patented Apr. 25, 1911.
2 SHEETS—SHEET 1.
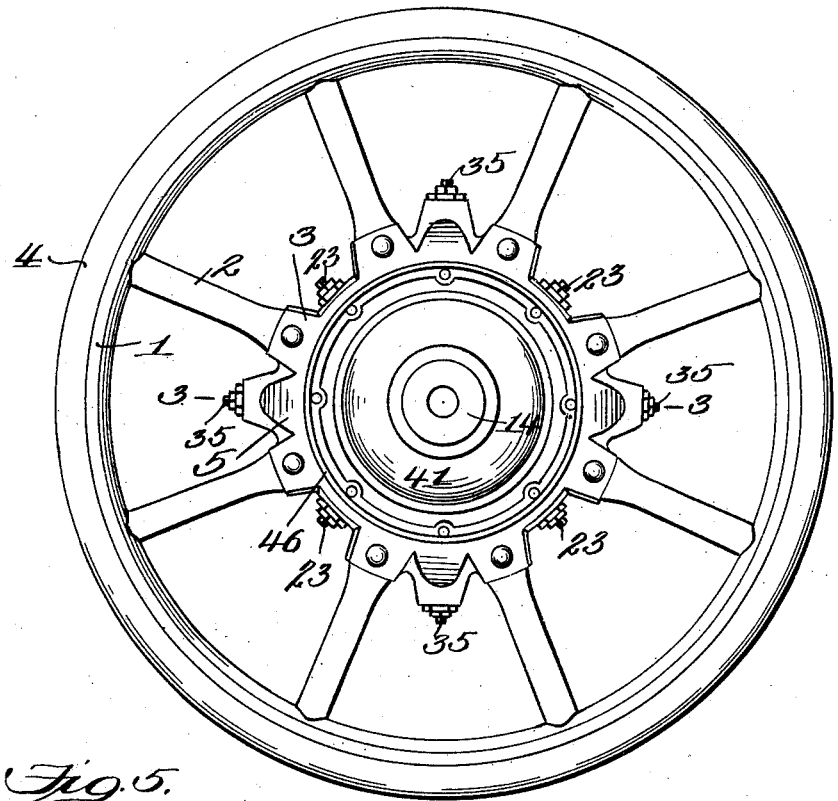
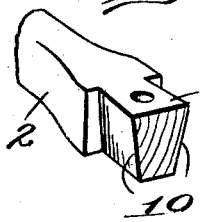
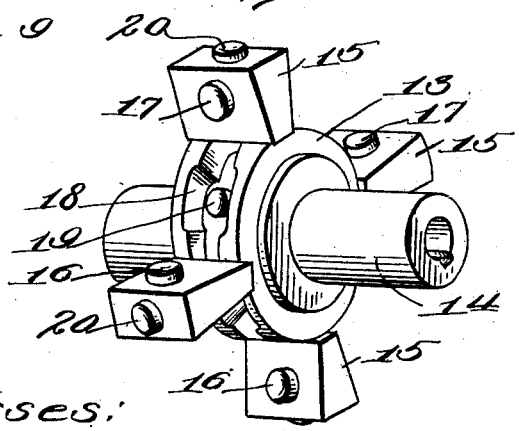
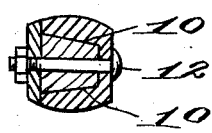
Witnesses:
Inventor
Joseph H. Hardwick
by James L. Norris
Atty
THE NORRIS PETERS CO., WASHINGTON, D. C.

J. H. HARDWICK.
VEHICLE WHEEL.
APPLICATION FILED JAN. 13, 1910.
990,649.
Patented Apr. 25, 1911.
2 SHEETS—SHEET 2.
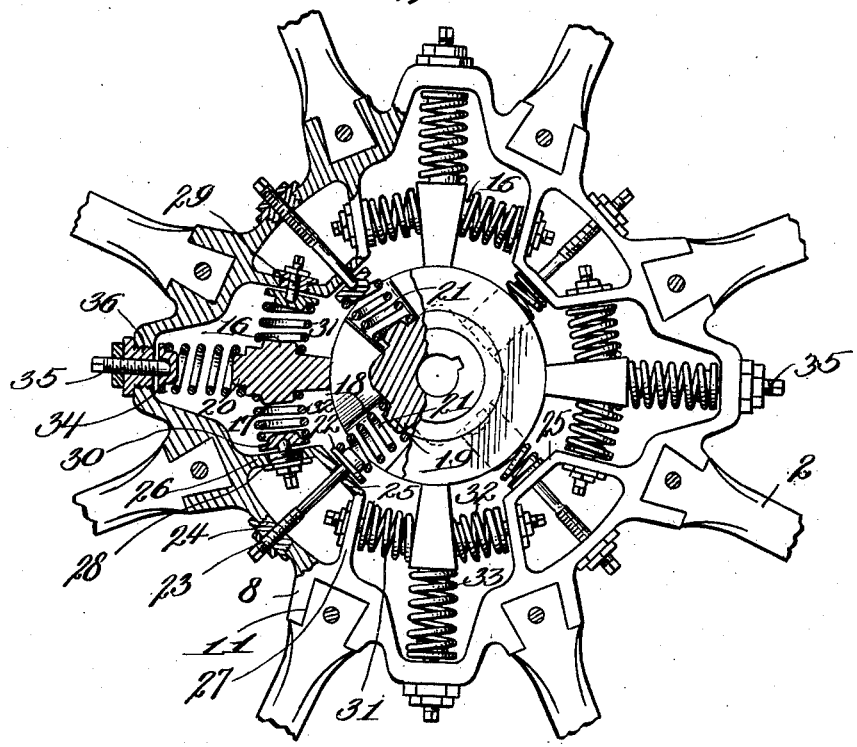
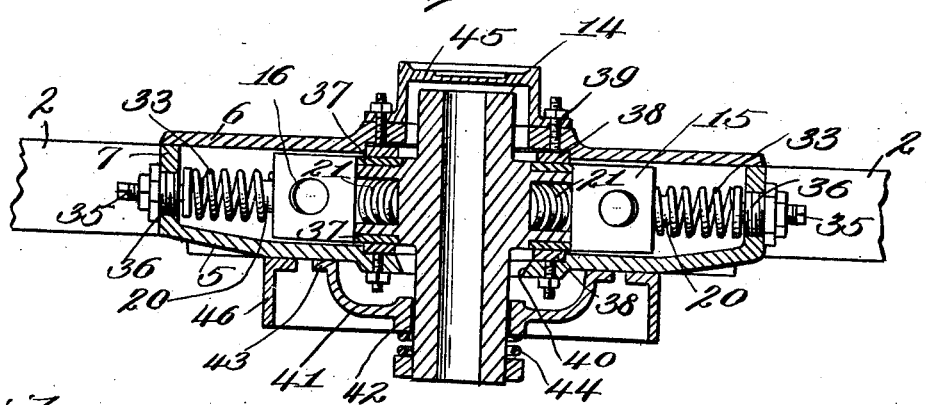
Witnesses:
Inventor
Joseph H. Hardwick
By
James L. Norris
Atty

UNITED STATES PATENT OFFICE.

JOSEPH H. HARDWICK, OF CLEVELAND, TENNESSEE, ASSIGNOR OF TWENTY-FOUR ONE-HUNDREDTHS TO JOHN C. McKENZIE AND TWENTY-FOUR ONE-HUNDREDTHS TO JESSE L. CLARK, BOTH OF CLEVELAND, TENNESSEE.

VEHICLE-WHEEL.

990,649.

Specification of Letters Patent. Patented Apr. 25, 1911.

Application filed January 13, 1910. Serial No. 537,898.

*To all whom it may concern:*

Be it known that I, JOSEPH H. HARDWICK, a citizen of the United States, residing at Cleveland, in the county of Bradley and State of Tennessee, have invented new and useful Improvements in Vehicle-Wheels, of which the following is a specification.

My present invention relates to improvements in vehicle wheels and especially to the type used upon automobiles, and it has for its object primarily to obviate the necessity of using pneumatic tires by providing a wheel wherein a set of springs are interposed and mounted in a novel manner between the wheel hub and the axle or shaft, the relative arrangement and mounting of the springs affording ample resilience to absorb all shock and vibration and yieldably sustaining and cushioning all forces tending to produce a relative turning movement between the wheel hub and the axle or shaft, engine and transmission strains being thereby reduced to a minimum, the arrangement of the springs moreover being such that they all act continuously to resiliently support the car or wheel, the springs being adjustable in order that the wheel may be properly centered and the strength of the springs may be adjusted appropriately according to the weight to be imposed thereon.

Another object of the invention involves the provision of a casing which in effect serves the dual purpose of a wheel hub and a dust-tight closure for the springs and operative parts of the wheel, one side or section of the casing being removable to facilitate assembling of the parts and to provide means of access to all of the parts for the purpose of adjustment or repair, the inclosing of the moving parts by the dust-tight closure enabling the parts to run in oil or suitable grease to minimize wear, means, however, being provided for taking up any wear that may occur between the sides of the casing whereby end thrust may be eliminated.

An important feature of the present invention is that it enables all the springs of the series to be arranged in the same plane, the thickness of the wheel hub being practically no more than that of the ordinary wheel so that wheels made in accordance with the present invention can be applied directly to automobiles or vehicles as usually constructed and, moreover, the action of the springs is more direct, certain of the springs forming in effect a firm clutch between the axle or shaft and the wheel.

To these and other ends, the invention consists in certain improvements, and combinations and arrangements of parts, all as will be hereinafter more fully described, the novel features of the invention being pointed out particularly in the claims at the end of the specification.

In the accompanying drawing: Figure 1 is an elevation of an automobile wheel constructed in accordance with the present invention, the wheel being viewed from the inner side; Fig. 2 is a detail enlarged view of the wheel hub with one of its sides removed to illustrate the springs and their mountings, parts being shown in section to illustrate more clearly the adjustment for the springs; Fig. 3 represents a section on the line 3—3 of Fig. 1, the parts, however, being shown on an enlarged scale; Fig. 4 is a perspective view of the inner member to which the shaft is connected; Fig. 5 is a detail perspective of the inner end of one of the spokes; and Fig. 6 is a detail sectional view showing the manner in which each spoke end is seated and locked in the wheel hub.

Similar parts are designated by the same reference characters in the several views.

In the accompanying drawing, I have shown one specific embodiment of the invention, it being adapted in the present instance for use upon the rear or driving axle of an automobile. It will be understood, however, that wheels embodying the present invention are also applicable to the front axles or knuckles of the ordinary automobiles or, in fact, the wheels may be applied to vehicles in general although they may be used to particular advantage upon automobiles in that the resilience of the springs eliminates the vibration and cushions all shocks that are ordinarily imposed upon the engine transmission and other mechanism of automobiles and, of course, the expense and annoyance incident to the use of pneumatic tires are obviated. It will be understood, however, that I have shown one form of the invention as an example and that certain modifications and changes may be made in the details thereof in order that the invention may be applied to the best advantage according to the circumstances of each particular case.

In the present instance, the wheel is composed generally of a rim 1, spokes 2 and a hub which is composed of an outer member 3 rigidly united with the rim by the spokes, and an inner member 13, hereinafter referred to, which engages the axle 3. The rim 1 is provided with a tire 4 which owing to the use of the springs in the hub of the wheel may be made solid, the tire, however, being preferably composed of a material that will afford a sufficient grip or hold upon the road or pavement and will prevent skidding. The hub is of a thickness approximately equal to that of the ordinary wheel of this type although it is preferably larger in diameter in order to provide sufficient space to accommodate springs of ample number and strength. This hub is preferably composed of two sections 5 and 6, one of the sections (the section 5 in the present instance) forming the inner side of the hub and also having a circumferential flange 7 provided with dove-tail sockets 8 to receive the inner ends of the spokes, this flange 7 also serving to support certain of the springs as will be hereinafter described. The section 6 of the hub is preferably in the form of a plate or disk which is arranged at the outer side of the wheel and is adapted to have a tight fit upon the complemental hub section 5 whereby dust will be excluded from the interior of the hub and oil or grease will be retained within the hub, if used.

Different modes of connecting the spokes to the hub may be used. I provide, however, a novel connection between the spokes and the hub which involves making the tenon 9 upon each spoke of a dove-tail form and also sloping the dove-tailed tenon by inclining its opposed faces 10 so as to converge. Each spoke socket 8 has a converging dove-tailed recess 11 which corresponds in size and shape to the tenon upon the spoke. After the outer end of each spoke has been properly inserted into the rim, its inner end is fastened to the hub by inserting the tapered dove-tail tenon thereon into the correspondingly shaped socket of the hub, and during the insertion of the tenon of the spoke into the socket, the taper form of the dove-tail will take up any looseness of fit. Preferably the same bolts 12 which unite the two hub sections 5 and 6 pass through the tenons of the several spokes and serve to lock the latter in position although when the wheel is complete the tenons of the spokes will be concealed and protected by the removable section 6 of the hub. This construction for the spokes is a simple one, it eliminates any movement between the spokes and the hub, and it enables any spoke to be removed and another substituted should this become necessary.

According to the present invention, a set of springs all arranged in the same plane are interposed between the hub of the wheel and the shaft or axle. In order to form appropriate seats for those ends of the springs which act upon the shaft or axle, I provide an inner member 13 which in the present instance has a sleeve portion 14 which will be keyed to the rear shaft of an automobile or it may be tapered and locked thereon by other means, and when the wheels are used upon the front axle, this sleeve will provide a suitable bearing for the rollers or balls. Projecting from the sleeve 14 are a suitable number of arms 15, these arms being spaced equidistantly around the circumference of the member 13 and are provided at opposite sides with spring seats which in the present instance are in the form of bosses 16 and 17. Between the arms 15, the member 13 is provided with a set of spring seats to engage springs which are arranged radially, the member 13 for this purpose being provided with recesses 18 and spring-centering projections 19. The outer ends of the arms 15 are also provided preferably with spring-centering projections 20 upon which a second set of radial springs are seated.

The member 13 is inserted centrally within the wheel hub and the arms 15 thereon are freely movable between the opposed inner and outer sides of the hub section of the wheel. One set of radial springs 21 are arranged about the member 13 and their inner ends bear radially against this member, they being centered by the projections 19. The outer end of each of the springs 21 is engaged by a relatively adjustable spring seat 22 which is acted upon by a screw 23, the outer end of this screw being threaded into a bushing 24 and is exposed exteriorly of the hub in order that the strength of its respective spring may be conveniently adjusted by the aid of an appropriate tool. This screw 23 extends at its inner end through a spring support 25 which is preferably formed as an integral part of the hub section 5, each of the supports 25 having a pair of surfaces 26 and 27 which are substantially parallel to the adjacent arms 15 of the inner member 13, and bushings 28 are preferably threaded into these respective sides of the support and are provided with screws 29 which act upon spring seats 30. A pair of springs 31 and 32 are interposed between the opposite sides of each arm 15 and the two adjacent spring supports 25 and the strength may be readily adjusted by means of the screws 29 which are accessible after removal of the hub section 6. Owing to the fact that these springs act in a direction substantially at right angles to the arms 15, these springs 31 and 32 will form a direct but yieldable clutch connection between the shaft or axle and the wheel and in wheels used upon the rear or driving shaft of an automobile, these springs will sustain the forward and rear driving force of the engine.

In order to amply sustain the radial forces between the shaft or axle and the wheel, I provide a second set of springs 33 the inner ends of which rest upon the outer ends of the arms 15 and are centered by the projections 20 thereon, while the outer ends of these springs 33 are supported by spring seats 34, the latter being adjustable through the medium of a screw 35 which is exposed at the exterior of the hub for adjustment and a bushing 36 which is threaded into the flange 7 of the hub section 5.

In operation, the two sets of radial springs 21 and 33 serve primarily to resiliently support the load imposed upon the wheel and these springs act at all times to perform this function. By locating the inner set of springs 21 between the arms 15 and locating the outer set of springs in alinement with these arms 15, a double set of radial springs is accommodated within the hub without increasing the thickness of the hub or, in other words, these two sets of radial springs are contained in the same plane although they are placed alternately and the advantage of this is that the action of the springs in the two sets is more uniform or even during the turning of the wheel owing to the numerous points of suspension of the axle or shaft. The forward and backing springs 31 and 32 are also accommodated in the same plane with the two sets of radial springs, they being placed at opposite sides of the arms 15 and between the two sets of radial springs. These forward and backing springs provide an efficient driving or clutch connection between the shaft or axle and the wheel whereby the driving force of the engine in propelling the vehicle forward or rearward may be transmitted to the wheel. Owing to the direct manner in which these forward and backing springs act, they form in effect a clutch connection. In the present instance, I have shown coiled springs and such springs are generally preferable owing to their amplitude of action within small space. It will be understood, however, that the invention is not necessarily limited to the use of springs of this particular type, as springs of other types may be used if found satisfactory.

Ordinarily, there will be little, if any, wear between the central member 13 for the axle or shaft and the opposed inner and outer surfaces of the hub. In order, however, to compensate for any wear that might occur and thereby prevent end play, I prefer to provide the member 13 with an annular wear plate 37 at each side, and I also prefer to recess the opposed sides of the hub sections 5 and 6 and to insert therein annular wear plates or rings 38, the latter being adjustable so as to compensate for wear through the medium of screws or bolts 39 which may be manipulated from the exterior of the hub. Either or both pairs of wear plates may be replaced easily when worn.

If the hub is to contain an oil or grease, the circumference of the opening in the inner section 5 and through which the member 13 extends is preferably beveled as at 40 whereby any oil reaching this opening will be caused to return to the hub. I also provide a simple but effective device for preventing dust entering the hub through this inner opening, it consisting of an annular disk 41 which has a hub 42 loosely mounted on the sleeve portion 14 and it has a rim 43 which has a close bearing against the exposed side of the hub section 5, close contact between the parts being maintained at all times by means of a compression spring 44 which is interposed between the hub 42 and a collar or other shoulder upon the sleeve 14. The opposite side of the hub is closed by a cap 45 fixed to the removable hub section 6.

46 designates a brake band which is attached directly to the hub.

According to the present invention, there are two sets of radially acting springs arranged in alternating relation, and two sets of circumferentially acting springs all of which springs are contained in a single plane. The thickness of the wheel need, therefore, be no greater than that of the ordinary wheel so that the improved wheel not only presents an attractive appearance, but such wheels can be applied directly to automobiles and similar vehicles without requiring alteration or modification thereof. By providing two sets of radial springs, one set in the same plane with the other, not only is space upon the axle minimized but the action of the springs is in a plane precisely perpendicular with the shaft or axle, there being no lateral or tilting forces exerted between the springs and the wheel which would cramp the parts and cause friction and wear.

The construction of the wheel is such that dust cannot reach the moving parts thereof, and the hub is removed from the wheel rim a distance sufficient to clear any mud that the wheel might ordinarily sink into.

I claim as my invention:

1. A vehicle wheel comprising a rim and a hub, said hub including an outer member to which the spokes are attached, and an inner member engaging the axle, said outer member of the hub having alternate inwardly projecting spring supports and outwardly projecting flanges, the face of the inner member having radial arms extending therefrom, a set of radially active springs interposed between the face of the inner member and the inwardly projecting spring supports, a second set of radially active springs engaging at one end the outer ends of said arms, and at the other end seated interiorly on the outwardly projecting flanges, and circumferentially active springs located at a radial distance intermediate the sets of radially active springs, each of said circumferentially active springs engaging at one end one of the radial arms and at the other end one of the inwardly projecting spring supports.

2. A vehicle wheel comprising a rim and a hub, said hub including an outer member having alternately arranged outwardly projecting flanges and inwardly projecting portions, and an inner member engaging the wheel axle having radial arms projecting therefrom, a set of radially active springs each spring engaging at one end the face of said inner member, and at the other end engaging the inner face of one of said inwardly projecting members, a second set of radially active springs each engaging at one end the outer face of a radial arm, and at the other end interiorly seated in one of the outwardly projecting flanges of the outer member of the hub, and circumferentially active springs each of which engages at one end the side face of one of the radial arms, and at the other end the side face of one of the inwardly projecting members on the outer hub, all the springs being arranged in the same plane.

3. A vehicle wheel involving a hub having a central aperture in its rear wall, an inner shaft engaging member resiliently supported for radial movement within the hub and having a sleeve extending through the aperture in the hub, and means for excluding dust from the hub comprising a disk movable axially with respect to the sleeve portion of the inner member and having its circumference bearing upon the hub exteriorly of the aperture therein, and resilient means acting on said disk to retain it in such engagement.

In testimony whereof I have hereunto set my hand in presence of two subscribing witnesses.

JOSEPH H. HARDWICK.

Witnesses:
WALTER ROBERTSON HOWARD,
A. L. THAYER, Jr.

---

Copies of this patent may be obtained for five cents each, by addressing the "Commissioner of Patents, Washington, D. C."